United States Patent
Esbensen

(10) Patent No.: US 12,281,638 B2
(45) Date of Patent: Apr. 22, 2025

(54) CONTROL OF WIND TURBINE DURING MECHANICAL OSCILLATION DAMPING

(71) Applicant: Siemens Gamesa Renewable Energy A/S, Brande (DK)

(72) Inventor: Thomas Esbensen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/633,662

(22) PCT Filed: Jul. 24, 2020

(86) PCT No.: PCT/EP2020/070992
§ 371 (c)(1),
(2) Date: Feb. 8, 2022

(87) PCT Pub. No.: WO2021/028198
PCT Pub. Date: Feb. 18, 2021

(65) Prior Publication Data
US 2022/0316444 A1   Oct. 6, 2022

(30) Foreign Application Priority Data

Aug. 14, 2019 (EP) .................................. 19191805

(51) Int. Cl.
*F03D 7/02* (2006.01)
*F03D 7/04* (2006.01)
(Continued)

(52) U.S. Cl.
CPC ......... *F03D 7/0296* (2013.01); *F03D 7/0284* (2013.01); *F03D 7/048* (2013.01);
(Continued)

(58) Field of Classification Search
CPC ........ F03D 7/0296; F03D 9/11; F03D 7/0284; F03D 7/048; H02P 9/105; H02P 2101/15; F05B 2260/964; F05B 2270/337
See application file for complete search history.

(56) References Cited

U.S. PATENT DOCUMENTS 9,467,082 B2   10/2016   Garcia
2011/0109085 A1   5/2011   Nelson
(Continued)

FOREIGN PATENT DOCUMENTS

CN   102668296 A   9/2012
CN   103119818 A   5/2013
(Continued)

OTHER PUBLICATIONS

PCT International Search Report & Written Opinion mailed Oct. 23, 2020 corresponding to PCT International Application No. PCT/EP2020/070992.

*Primary Examiner* — Viet P Nguyen
(74) *Attorney, Agent, or Firm* — Schmeiser, Olsen & Watts LLP

(57) ABSTRACT

Provided is a method of controlling a wind turbine during damping a mechanical oscillation of the wind turbine having a generator system coupled to a rotor at which plural rotor blades are mounted, the method including: generating a damping control signal in dependence of an indication of the oscillation; performing damping control of the generator system based on the damping control signal causing damping related power output variation at an output terminal of the generator system; and controlling an energy storage device connected to the output terminal of the generator system and connected to an output terminal of the wind turbine based on the damping control signal.

15 Claims, 3 Drawing Sheets

Figure 1:
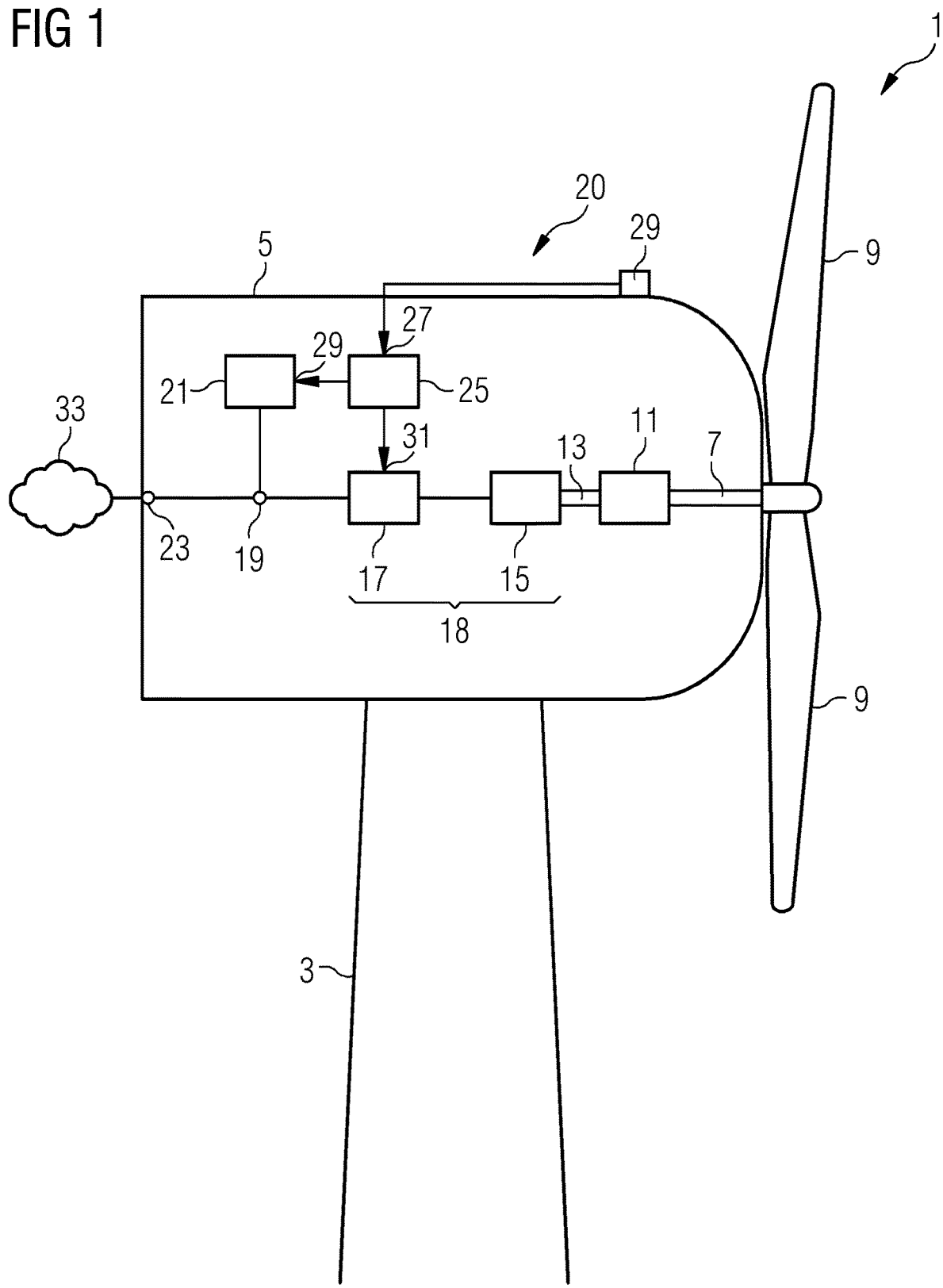

(51) Int. Cl.
  *F03D 9/11*   (2016.01)
  *H02P 9/10*   (2006.01)
  *H02P 101/15*   (2016.01)

(52) U.S. Cl.
  CPC ................ *F03D 9/11* (2016.05); *H02P 9/105* (2013.01); *F05B 2260/964* (2013.01); *F05B 2270/337* (2013.01); *H02P 2101/15* (2015.01)

(56)  References Cited

U.S. PATENT DOCUMENTS

| | | |
  |---|---|---|
  | 2013/0200621 A1 | 8/2013 | Andresen |
  | 2013/0234680 A1 | 9/2013 | Kolwalkar et al. |
  | 2013/0300116 A1 | 11/2013 | Egedal |
  | 2014/0361537 A1 | 12/2014 | Andresen |
  | 2015/0381089 A1* | 12/2015 | Tarnowski ................ H02J 3/24 290/44 |
  | 2016/0377057 A1 | 12/2016 | Caponetti |
  | 2017/0328342 A1* | 11/2017 | Kjær ......................... F03D 9/25 |
  | 2017/0346427 A1 | 11/2017 | Thet et al. |

FOREIGN PATENT DOCUMENTS

| | | | |
  |---|---|---|---|
  | CN | 105899804 A | 8/2016 | |
  | WO | WO-2010069450 A2 * | 6/2010 | ........... F03D 7/0296 |
  | WO | 2011045263 A1 | 4/2011 | |

* cited by examiner

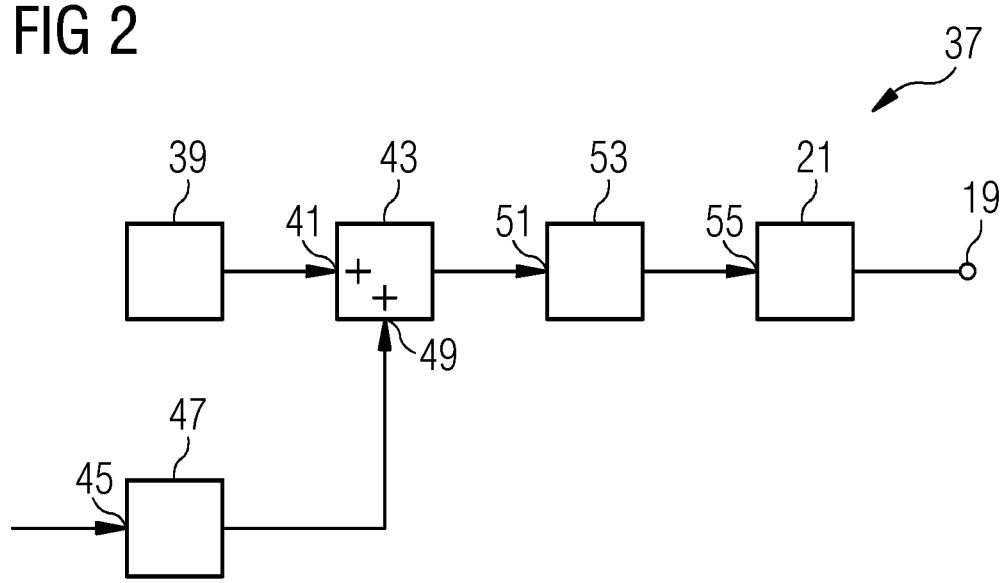
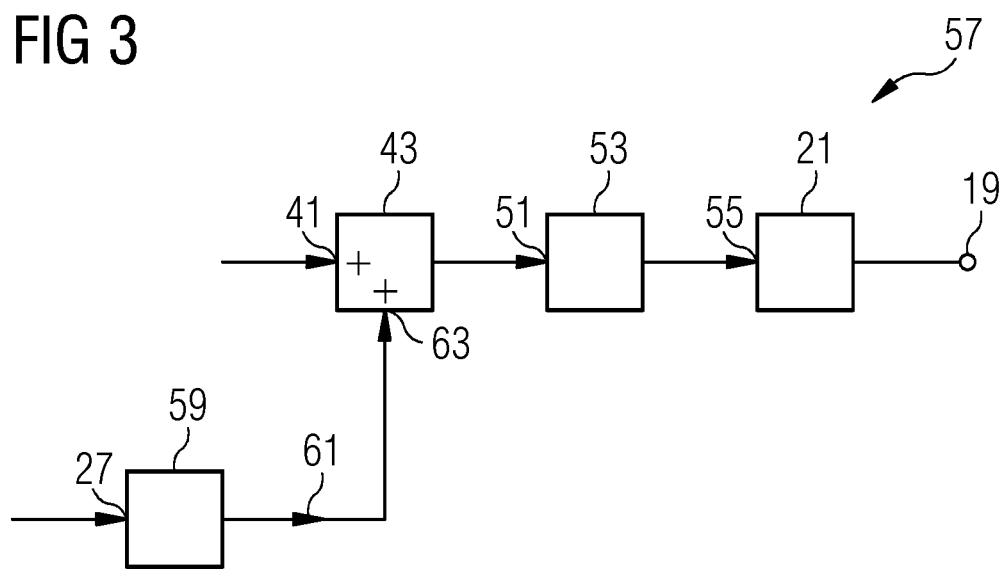

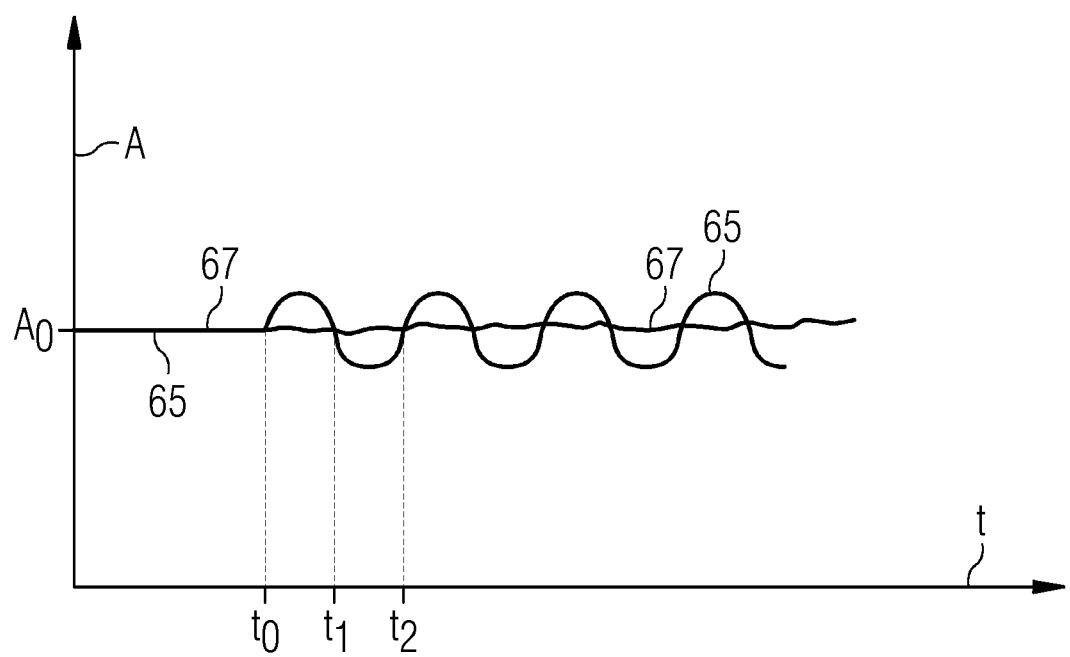

CONTROL OF WIND TURBINE DURING MECHANICAL OSCILLATION DAMPING

CROSS-REFERENCE TO RELATED APPLICATIONS

This application claims priority to PCT Application No. PCT/EP2020/070992, having a filing date of Jul. 24, 2020, which claims priority to EP Application No. 19191805.1, having a filing date of Aug. 14, 2019, the entire contents both of which are hereby incorporated by reference.

FIELD OF TECHNOLOGY

The following relates to a method and to an arrangement of controlling a wind turbine during damping a mechanical oscillation of the wind turbine and further relates to a wind park including at least one wind turbine and the arrangement.

BACKGROUND

A wind turbine comprises a wind turbine tower, a nacelle mounted on top of the wind turbine tower, wherein the nacelle harbours a rotor having mounted thereon plural rotor blades. The rotor is coupled to an electric generator which generates electric energy upon rotation of the rotor. The rotor may be coupled via an operational gearbox to the generator. The wind turbine may comprise further a converter for converting the variable frequency power stream delivered by the generator to a fixed frequency power stream, such as having a nominal frequency of 50 Hz or 60 Hz and satisfying a power reference provided to the generator including the converter from for example a wind turbine controller.

Mechanical components of the wind turbine are subject to oscillations during operation of the wind turbine. For example, during operation of the wind turbine, tower oscillations, such as side-side tower oscillations, may occur. Further, the drive train including a gearbox and/or one or more bearings and other mechanical components may be excited to perform oscillations. The mechanical oscillations of one or more wind turbine components may be undesired, since these oscillations may cause wear or even damage of one or more components.

Therefore, a conventional wind turbine may use an active damping procedure to stabilize the tower oscillations or drive train oscillations and/or in order to reduce loads. Thereby, sinusoidal offsets may be added to a power or torque reference which is supplied to the generator system to control the generator system. Thereby, the active tower damping may control the generator torque (or power) to dampen for example a side-side tower oscillation. Such a damping power offset signal may be generated from the measurement of tower acceleration or nacelle acceleration. The measurement signal may be filtered in order to amplify and compensate phase of the tower eigenfrequency. The tower eigenfrequency may for example be around 0.3 Hz.

An active drive train damping procedure may control the generator torque (power) to dampen drive train modes. A corresponding damping power offset signal may be generated from a measured or estimated rotational speed, by filtering the signal to amplify and compensate phase of the first drive train modes. Sometimes only the first mode and sometimes also the second or even the third mode may be damped. Examples for drive train frequencies are 1.8 Hz, 4 Hz, 8 Hz.

It has however been observed that a conventional control of a wind turbine during damping of mechanical oscillation may have undesired effects on the power output causing electrical instability or disturbance.

Thus, there may be a need for a method and for an arrangement of controlling a wind turbine during damping a mechanical oscillation of the wind turbine, wherein problems as observed in the conventional methods are mitigated and wherein in particular undesired influences on electrical properties are mitigated.

SUMMARY

According to an embodiment of the present invention it is provided a method of controlling a wind turbine during damping a mechanical oscillation of the wind turbine having a generator system coupled to a rotor at which plural rotor blades are mounted, the method comprising: generating a damping control signal in dependence of an indication of the oscillation; performing damping control of the generator system based on the damping control signal causing damping related power output variation at an output terminal of the generator system; and controlling an energy storage device connected to the output terminal of the generator system and connected to an output terminal of the wind turbine based on the damping control signal.

The method may be performed by a wind turbine controller or a wind park controller. The method may not only be applied to one turbine but to plural wind turbines of a wind park. The wind park may comprise a single wind park energy storage device or several wind park energy storage devices. In other embodiments, each wind turbine of the wind park may comprise an individual energy storage device.

The mechanical oscillation may comprise an oscillation or vibration including a reciprocating periodic motion of one or more mechanical components of the wind turbine. The method may for example be adapted to control the wind turbine during damping of several mechanical oscillations of one or more different or same mechanical components of the wind turbine. Further, the method may be adapted to damp several different modes of each one of the mechanical components. The mechanical oscillation may for example relate to a mechanical oscillation of the wind turbine tower including a side-side oscillation or a back-forth oscillation of the wind turbine tower. Different mechanical oscillations of different components of the wind turbine may be characterized by different (eigen)frequencies or (eigen)frequency ranges. The method of controlling during damping may be capable of being performed at any frequency of any mechanical oscillation.

The generator system may include at least an electric generator, for example a permanent magnet synchronous machine having a stator with one or more winding sets, for example three-phase or six-phase or even more phase winding set(s). The rotor may directly or via an optional gearbox be coupled to the generator. The damping control signal may be generated such as to dampen the one or more mechanical oscillations of one or more wind turbine components. The damping control signal may for example be generated based on a measurement of an acceleration of the tower and/or the drive train and/or the nacelle or any other component of the wind turbine which exhibits an oscillation and which oscillation is to be damped. The indication of the oscillation may thus comprise an acceleration signal of the considered component or a component connected to the component to be damped.

The damping control signal may have a frequency of the oscillation to be damped but may have a phase offset in order to counteract the mechanical oscillation when the damping control signal is utilized to control the generator system. Performing the damping control may thus comprise to supply the damping control signal (or a signal derived therefrom) to the generator system, in particular a converter comprised in the generator system. The damping control signal may cause the generator system to output (in particular additionally to a preliminary power or a nominal power as derived from a preliminary power reference) a damping related power output variation at the output terminal of the generator system. The output terminal of the generator system may for example be implemented as an output terminal of the generator or an output terminal of a converter which is coupled to the generator. The wind turbine may further comprise a wind turbine transformer which may be connected to the generator system. The output terminal of the generator system may then either be considered to be a node between the generator and the wind turbine transformer or a node between the (optional) converter and the wind turbine transformer. In other embodiments, the output terminal of the generator system may be considered to be a node at a secondary side of the wind turbine transformer (if present).

Performing damping control may involve that the generator system outputs a damping related active power output variation. Damping related active power output variation may involve variation of an amplitude of a power output.

Not the generator system may be aimed to be damped, but mechanical oscillation of e.g. the drive train and/or tower modes. The term "damping control of the generator system" may be understood to denominate a particular control of the generator aimed to dampen the above mentioned mechanical oscillations.

The energy storage device may be capable of storing electric energy. The energy storage device may comprise or may not comprise mechanical components, such as a flywheel and/or may comprise electrical components such as a capacitor, a battery. The energy storage device may also comprise mechanical and/or electrical components and/or chemical components. The controlling the electrical storage device may be related to charging or discharging the energy storage device in dependence of the damping control signal and/or in dependence of the damping related power output variation.

The energy storage device is connected to the output terminal of the generator system. Thereby, during particular time periods, the energy storage device may be controlled to be charged from a portion of the power output as delivered by the generator system, in particular the portion corresponding to the damping related power output variation. In other time intervals, the storage device may be controlled to be discharged. Thereby, the power output at the output terminal of the wind turbine may be smoothed in the way that the contribution of the damping related power output variation is reduced or is ideally substantially removed. Thus, the power output at the output terminal of the wind turbine may to a better degree comply with a (preliminary) power reference which may have been derived by the wind turbine controller or by an external controller without involving damping capabilities of the mechanical oscillation. Thus, the energy storage device may for example be controlled to charge and discharge in an oscillating manner the oscillation having a frequency of the damping control signal and also having an amplitude derived from the damping control signal. Thereby, power output of the wind turbine or the entire wind park may to a better degree correspond or being equal to power output as governed by a (preliminary) power reference, in particular active power reference. Thereby, stability of an utility grid to which the wind turbine or the entire wind park may be connected may be improved.

According to an embodiment of the present invention, the controlling an energy storage device based on the damping control signal is performed such as to substantially compensate for the damping related (in particular active) power output variations at the output terminal of the wind turbine, in particular such that the damping related power output variation at the output terminal of the generator system is substantially removed at the output terminal of the wind turbine.

Compensating for the damping related (active) power output variation may involve to reduce the damping related active power output variations to between 0% and 30%, in particular between 0% and 10% of the damping related power output variations as caused by the damping control signal and the control of the generator system. Thereby, grid stability may be improved, in particular when the method is applied to plural wind turbines of a wind park which may for example be synchronized due to a grid event or to a gust event.

According to an embodiment of the present invention, controlling the energy storage device comprises: controlling the energy storage device such as to charge when (e.g. an AC component of) the damping related power output variation as caused by the damping control signal is positive; and/or controlling the energy storage device such as to discharge when (e.g. an AC component of) the damping related power output variation as caused by the damping control signal is negative.

Nominally, the wind turbine may be controlled by a (preliminary) power reference defining an amplitude (e.g. substantially DC component) of power output. When the damping related power output variation is positive its amplitude may be higher than the nominal amplitude of the power reference. When the damping related power output variation is negative, the corresponding amplitude may be lower than the amplitude of the nominal power reference or nominal power output. Thus, the energy storage device may be charged and discharged in an oscillating manner, wherein the oscillation frequency may correspond to the frequency of the damping control signal or may correspond to the frequency of the variation of the amplitude of the damping related power output.

According to an embodiment of the present invention, the damping control signal defines a variation of an amplitude of the power output, the variation of the amplitude (e.g. A) in particular having a frequency between 0.1 Hz and 5 Hz.

According to an embodiment of the present invention, controlling the energy storage device based on the damping control signal comprises: supplying an energy storage controller input signal based on the damping control signal to an energy storage controller; generating an energy storage device control signal by the energy storage controller; controlling the energy storage by the energy storage device control signal.

The energy storage controller may be capable of charging or discharging the energy storage device based on the damping control signal. For example, the energy storage controller may be configured to discharge/charge during a particular time interval the energy storage device utilizing a particular power exchange between the energy storage device and the output terminal of the generator system.

According to an embodiment of the present invention, the energy storage controller input signal is proportional to the damping control signal. In particular, the energy storage controller input signal may not comprise a preliminary power reference. The damping control signal may be generated by a damping controller based on the indication of the oscillation. In this embodiment, the damping related power output variation may exclusively include power output variation which is caused by damping of one or more wind turbine components.

In other embodiments, the damping related power output variation may comprise power output variation which is not caused by any damping activity, but which may be related to fast changes of for example a preliminary power reference or in general fast changes of a power reference being not related to any damping activity.

According to an embodiment of the present invention, the energy storage controller input signal is proportional to a high pass filtered generator system active power reference (e.g. as derived taking into account the damping control signal) and/or high pass filtered generator system measured active power and/or high pass filtered generator system estimated active power, the generator system active power reference (or measured active power or estimated active power) defining an amplitude of a oscillating power reference (or measured active power or estimated active power), wherein the generator system active power reference has some dynamics coming from coping with an operation point of the turbine, and a damping related power reference, being composed of one or more AC components.

When the input signal for the energy storage controller is created using a high pass filter, and not particularly reacting at the damping frequency (or damping frequencies), then the energy storing device enables a smoothen turbine output power. In this configuration, higher frequency components will not appear on the grid; neither damping frequency (or damping frequencies) components or fluctuations events or originating from auxiliary consumption driving motors/pumps/fans, etc.

The generator system active power reference may define the (e.g. active) power which is desired to be output by the generator system which however includes portions related to the damping activity and/or portions related to other disturbances, such as grid event related. The preliminary power reference may define an intended power output of the wind turbine without considering any damping of any component. According to an embodiment of the present invention, the actual power output at the wind turbine output terminal may substantially correspond to the preliminary power reference. The energy storage device may effectively function as a filter to filter out from the power output at the output terminal of the wind turbine those power portions which are generated for damping purposes of mechanical oscillations of one or more components. In this sense, the energy storage device may act as a low path filter of the power output at the wind turbine output terminal to smoothen the output power. The preliminary power reference may define a (e.g. substantially constant) amplitude of intended power output.

According to an embodiment of the present invention, high pass filtering the generator system active power reference filters out components having frequencies lower than the lowest drive train oscillation frequency or/and the lowest tower oscillation frequency, in particular frequencies lower than 0.1 Hz.

When the components having frequencies lower than the lowest drive train oscillation frequency and/or the lowest tower oscillation frequency are substantially filtered out (or at least reduced to between 0% and 20% of their initial values), the actual damping caused power variations may effectively be recovered which are suitable for controlling the energy storage device.

According to an embodiment of the present invention, the damping related power variation has a frequency between 0.1 Hz and 10 Hz and/or an amplitude of between 200 kW and 600 kW. Thereby, typical oscillations of a tower and/or a drive train may be covered. Furthermore, typical amplitudes of those oscillations may be supported in configuring the energy storage device to be capable to be charged or be discharged with power between 200 kW and 600 kW.

According to an embodiment of the present invention, the energy storage device comprises at least one of: a battery; a capacitor, wherein the energy storage device is in particular configured to absorb or output an electric power of between 100 kW and 500 kW for between 1 s and 3 s. Thereby, conventionally available energy storage devices may be utilized for implementation the method. Furthermore, the energy storage device may thereby be capable of effectively compensating for power output variations caused by the tower and/or the drive train or another component.

According to an embodiment of the present invention, the mechanical oscillation comprises at least one of: a tower oscillation, in particular side-side oscillation, of a wind turbine tower; a drive train oscillation of a wind turbine drive train. Thereby, critical oscillation may be supported to be damped while ensuring less interference with desired power output.

According to an embodiment of the present invention, the method is performed during a utility grid event including drop of wind turbine output power and/or wherein the method is performed during a gust event including increased wind speed; and/or wherein the method is performed on wind turbine level; and/or wherein the method is performed on wind park level.

A utility grid event may for example involve a voltage drop and may cause a rapid drop in (required or possible) power output for all wind turbines of a wind park. In this case, all wind turbines of a wind park may start a similar reaction and a same instance of time. The drop in power may remove the counter-torque from the generator and hence the wind turbine towers may start to oscillate, in particular in a synchronized manner. Thereby, in order to dampen the synchronized tower oscillation, the wind turbine may apply synchronized damping signals or synchronized active tower damping offset. In a conventional system, this may be a problem on a park level, because it may give a resulting large AC component delivered to the utility grid at the wind turbine tower frequency.

Thus, the method can be used to filter out a damping power related component after grid events where turbines may tend to synchronize.

According to this embodiment of the present invention however, the damping related power output variations are compensated for or at least reduced, thereby, the conventionally observed large AC component delivered to the utility grid may not be present any more.

Conventionally, when synchronized wind turbines each add for example 200 kW on top of a preliminary power reference, the wind park output may provide additional output 200 kW times the number of turbines. Embodiments of the present invention avoid this large and sudden increase of the power output.

Conventionally, a similar problem may have been observed for gust events, where a wind passage may hit many turbines simultaneously. Also in this case, a synchronized damping reaction of all wind turbines may take place which may have caused problems in conventional systems. Due to the compensation of the power output variations by absorbing them substantially in the energy storage device, these problems may be mitigated.

Also conventionally, active drive train damping may have caused problems due to a synchronization of the damping activity which may be mitigated or even removed according to embodiments of the present invention.

It should be understood, that features, individually or in any combination, disclosed, described, explained or provided for a method of controlling a wind turbine during damping a mechanical oscillation of the wind turbine may, individually or in any combination, also provided for or applied to an arrangement for controlling a wind turbine during damping a mechanical oscillation of the wind turbine according to an embodiment of the present invention and vice versa.

According to an embodiment of the present invention it is provided an arrangement for controlling a wind turbine during damping a mechanical oscillation of the wind turbine, the arrangement comprising: a generator system coupled to a rotor at which plural rotor blades are mounted and having an output terminal of the generator system; and an energy storage device connected to the output terminal of the generator system and connected to an output terminal of the wind turbine; wherein the arrangement is adapted: to generate a damping control signal in dependence of an indication of the oscillation; to perform damping control of the generator system based on the damping control signal causing damping related power output variation at the output terminal of the generator system; and to control the energy storage device based on the damping control signal.

The arrangement may be configured to perform the method of controlling the wind turbine during damping according to an embodiment of the present invention. The arrangement may for example be implemented partly as a hardware and/or software component, for example a wind turbine controller or a wind park controller.

According to an embodiment of the present invention, the generator system comprises a generator and in particular a converter coupled to the generator, the generator and/or the converter being controlled by the damping control signal or a generator system active power reference.

Further, according to an embodiment of the present invention, a wind park is provided including at least one wind turbine and an arrangement according to the preceding embodiments.

When the method is performed on a wind park level, not every wind turbine of the wind park need to have an individual energy storage device but there may be one or more wind park energy storage device(s).

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 1 schematically illustrates a wind turbine according to an embodiment of the present invention including an arrangement for controlling a wind turbine during damping a mechanical oscillation according to an embodiment of the present invention;

FIG. 2 schematically illustrates a portion of an arrangement for controlling a wind turbine during damping a mechanical oscillation according to an embodiment of the present invention;

FIG. 3 schematically illustrates another portion of an arrangement for controlling a wind turbine during damping a mechanical oscillation according to an embodiment of the present invention; and FIG. 4 illustrates a graph of power output as achieved in embodiments of the present invention compared to the prior art.

DETAILED DESCRIPTION

The wind turbine 1 schematically illustrated in FIG. 1 according to an embodiment of the present invention comprises a wind turbine tower 3 and a nacelle 5 mounted on top of the tower. The nacelle 5 harbours a rotation shaft 7 at which plural rotor blades 9 are mounted. A gearbox 11 transforms the rotation of the main shaft 7 into a rotation of a secondary shaft 13 which is coupled to an electric generator 15 which generates electric power (in particular three-phase power) and delivers it to an optional converter 17. The converter 17 converts the variable frequency power stream delivered by the generator 15 to a substantially fixed frequency power stream at an output terminal 19 of the converter. Thereby, the converter 17 together with the generator forms a generator system 18.

The wind turbine 1 comprises an arrangement 20 for controlling the wind turbine 1 during damping a mechanical oscillation of the wind turbine. Thereby, the arrangement 20 comprises the generator system 18 coupled to the rotor 13 and indirectly also to the main rotor 7 at which the plural rotor blades 9 are mounted. The generator system 18 has the output terminal 19. The arrangement 20 further comprises an energy storage device 21 which is connected to the output terminal 19 of the generator system 18 and is connected to an output terminal 23 of the wind turbine 1.

The arrangement 20 comprises a processing section 25 which receives an oscillation indicating signal 27 from an accelerometer 29 mounted e.g. on the nacelle 5. In dependence of the oscillation indicating signal 27, the processing section 25 generates a damping control signal 29 which is added to a preliminary power reference (not indicated) and supplied as a control signal 31 to the converter 17. Thereby, the converter 17 is controlled to perform damping control of the generator system 18 causing the damping related power output variation at the output terminal 19 of the generator system 18.

The arrangement 20 is further adapted to control, in particular by the damping control signal 29 or a signal derived therefrom, the energy storage device 21 (which may include a not illustrated device controller) based on the damping control signal 29. The energy storage device is also connected to the output terminal 19 of the generator system 18.

According to the conventional procedure in order to avoid synchronization of damping related AC components output by plural wind turbines, the active tower damping is disabled for some period after a grid event, for example 10-30 s. However, this also means that the damping provided by this control function to prevent side-side oscillations of the tower is temporarily turned off and higher loading may occur.

When a grid event happens, the need for active damping is present causing these problems.

According to embodiments of the present invention, at least one energy storage device 21 is introduced or incorporated in the wind turbine, in particular in the nacelle 5 of the wind turbine 1. The energy storage device 21 may have only a small energy capacity, such as 200-400 kW for up to 3 seconds. The active tower damping may ensure that the generated power generated by the generator system 18 will have an AC component in it, to have a torque on the generator that is used for active tower damping. However, the energy buffer (energy storage device 21) may be used to decrease or even remove the AC component from the power delivered from the wind turbine to the wind farm, or to the utility grid 33 which is directly or indirectly connected to the output terminal 23 of the wind turbine.

The power delivered from the wind turbine 1 at node 23 may be only the DC component, by controlling the energy storage device 21 to charge when the AC component is positive and to discharge when the AC component is negative. The AC component is the active tower damping power offset signal, that typically has a frequency around 0.3 Hz and may have an amplitude of typically up to 400 kW (for example for a 8 MW wind turbine). The energy storage may be a battery or a capacitor or the like including a flywheel.

FIG. 2 schematically illustrates a portion of the processing section 25 of the arrangement 20 illustrated in FIG. 1, in particular the active drive train damping module 37. A wind turbine controller 39 provides a preliminary power reference 41 to an addition element 43. A rotational speed 45 is provided to an active drive train damping module 47 which derives therefrom a drive train damping signal 49. The drive train damping signal 49 is added to the preliminary power reference 41 to result in a generator system active power reference 51. The generator system active power reference 51 is filtered using a high pass filter 53 which filters out low frequency components resulting in a high pass filtered generator system active power reference 55.

Instead of using the damping control signal 29 as depicted in FIG. 1 for controlling the energy storage device 21, in this embodiment as illustrated in FIG. 2, the high pass filtered generator system active power reference 55 is utilized to control the energy storage device 21 which is connected to the output terminal 19 of the generator system 18 as is the case in the wind turbine 1 as illustrated in FIG. 1.

FIG. 3 schematically illustrates a portion 57, in particular an active tower damping side-side module of the processing section 25 of the arrangement 20 as illustrated in FIG. 1. Using the acceleration signal 27 as derived or measured by the accelerometer 29 after filtering and phase-shifting by a filter phase-shift element 59, an active tower damping control signal 61 is obtained which is added using an addition element 63 to a preliminary power reference 41, in order to obtain a generator system active power reference 51. This signal 51 is filtered using the high pass filter 53 to obtain the high pass filter generator system active power reference 55 which is utilized as in FIG. 2 to control the energy storage device 21.

According to another embodiment of the present invention, the active tower damping control signal 61 and the drive train damping control signal 49 are both added to the preliminary power reference 41 to derive a respective sum signal which is high pass filtered using the filter 53 and supplied to the energy storage device for controlling the same.

FIG. 4 illustrates a graph having as abscissa the time t and having as the ordinate the amplitude A of a variation of active power output. Up to the point in time $t_0$, the amplitude stays constant at a (e.g. nominal) value $A_0$. The curve 65 indicates the power output as observed at the output terminal 19 of the generator system 18 according to the prior art. Beyond the point in time $t_0$, the amplitude of curve 65 varies in a sinusoidal manner.

The curve 67 indicates the power output of the wind turbine at the wind turbine output terminal 23 according to an embodiment of the present invention. As is evident from FIG. 4, the amplitude of the power output (curve 67) stays also substantially constant beyond the point in time to due to controlling the energy storage device 21. In particular, in the time interval from $t_0$ to $t_1$, the energy storage device 21 is charged in order to remove the power output exceeding the nominal amplitude $A_0$. In a time interval $t_1$ to $t_2$, the energy storage device 21 is discharged to compensate for the amplitude of the power output curve 65 to be lower than the nominal amplitude $A_0$.

The nominal amplitude $A_0$ may be considered as an example of a preliminary power reference. Advantageously, embodiments of the present invention allow to enable the active tower damping and/or other active power damping during or after a grid event knowing that the power output from the wind turbines will not have the active power damping AC component that may synchronize for multiple turbines in case of a grid event or a gust event. Hence, better dampening may be achieved with less interference of the park active electrical power performance.

The storage capacity of the energy storage device 21 may be very small for this application, thus does not represent an expensive investment.

Instead of having the energy storage device 21 on the wind turbine level it may be introduced at the park level, for example at a substation. The energy storage to remove the AC component may be applied all the time and not only after a grid event.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine during damping a mechanical oscillation of the wind turbine having a generator system coupled to a rotor at which a plurality of rotor blades are mounted, the method comprising:
    generating a damping control signal to dampen the mechanical oscillation of one or more mechanical components of the wind turbine, the damping control signal generated based on a measurement of the one or more mechanical components;
    performing damping control of the generator system based on the damping control signal causing damping related power output variation at an output terminal of the generator system; and
    controlling an energy storage device connected to the output terminal of the generator system and connected to an output terminal of the wind turbine based on the damping control signal;
wherein controlling the energy storage based on the damping control signal comprises:

supplying an energy storage controller input signal based on the damping control signal to an energy storage controller;

generating an energy storage device control signal by the energy storage controller; and controlling the energy storage by the energy storage device control signal;

wherein the generator system active power reference includes a preliminary power reference, being dynamic to comply to an operating point of the wind turbine, and a damping related power reference or damping control signal, being composed of one or more AC components.

2. The method according to claim 1, wherein the controlling the energy storage device based on the damping control signal is performed to substantially compensate for the damping related power output variations at the output terminal of the wind turbine, such that the damping related power output variation at the output terminal of the generator system are substantially removed at the output terminal of the wind turbine.

3. The method according to claim 1, wherein controlling the energy storage device comprises:

controlling the energy storage device to charge when the damping related power output variation as caused by the damping control signal is positive; and/or controlling the energy storage device to discharge when the damping related power output variation as caused by the damping control signal is negative.

4. The method according to claim 1, wherein the damping control signal defines a variation of an amplitude of a power output and/or a variation of an amplitude having a frequency between 0.1 Hz and 5 Hz.

5. The method according to claim 1, wherein the energy storage controller input signal is proportional to the damping control signal.

6. The method according to claim 1, wherein high pass filtering the generator system active power reference filters out components having frequencies lower than a lowest drive train oscillation frequency or/and a lowest tower oscillation frequency, including frequencies lower than 0.1 Hz.

7. The method according to claim 6, wherein the damping related power variation has a frequency between 0.1 Hz and 10 Hz and/or an amplitude of between 5% to 10% of a nominal power amplitude between 150 kW and 600 kW.

8. The method according to claim 1, wherein the energy storage device comprises at least one of:
  a battery, and
  a capacitor;

wherein the energy storage device is configured to absorb or output an electric power of between 100 kW and 500 kW for between 1 s and 10 s.

9. The method according to claim 1, wherein the mechanical oscillation comprises at least one of:

a tower oscillation of a wind turbine tower, and
a drive train oscillation of a wind turbine drive train.

10. The method according to claim 1, wherein the method is performed during a utility grid event including drop of wind turbine output power and/or wherein the method is performed during a gust event including increased wind speed; and/or wherein the method is performed on wind turbine level; and/or wherein the method is performed on wind park level.

11. The method according to claim 1, wherein the energy storage controller input signal is proportional to a high pass filtered generator system active power reference, the generator system active power reference defining an amplitude of a power reference.

12. An arrangement for controlling a wind turbine during damping a mechanical oscillation of the wind turbine, the arrangement comprising:

a generator system coupled to a rotor at which a plurality of rotor blades are mounted and having an output terminal of the generator system; and an energy storage device connected to the output terminal of the generator system and connected to an output terminal of the wind turbine;

wherein the arrangement is configured:

to generate a damping control signal to dampen the mechanical oscillation of one or more mechanical components of the wind turbine, the damping control signal generated based on a measurement of the one or more mechanical components;

to perform damping control of the generator system based on the damping control signal causing damping related power output variation at the output terminal of the generator system; and to control the energy storage device based on the damping control signal;

wherein controlling the energy storage based on the damping control signal comprises:

supplying an energy storage controller input signal based on the damping control signal to an energy storage controller;

generating an energy storage device control signal by the energy storage controller; and controlling the energy storage by the energy storage device control signal;

wherein the generator system active power reference includes a preliminary power reference, being dynamic to comply to an operating point of the wind turbine, and a damping related power reference or damping control signal, being composed of one or more AC components.

13. An arrangement according to claim 12, wherein the generator system comprises a generator and a converter coupled to the generator, the generator and/or the converter being controlled by the damping control signal or a generator system active power reference.

14. The arrangement according to claim 12, wherein the energy storage controller input signal is proportional to a high pass filtered generator system active power reference, the generator system active power reference defining an amplitude of a power reference.

15. A wind park including:
at least one wind turbine; and
the arrangement according to claim 13.

* * * * *